United States Patent
Lynch

(10) Patent No.: US 8,621,220 B2
(45) Date of Patent: Dec. 31, 2013

(54) SYSTEMS AND METHODS FOR IDENTITY ENCAPSULATED CRYPTOGRAPHY

(75) Inventor: Liam Sean Lynch, San Jose, CA (US)

(73) Assignee: eBay Inc., San Jose, CA (US)

( * ) Notice: Subject to any disclaimer, the term of this patent is extended or adjusted under 35 U.S.C. 154(b) by 261 days.

(21) Appl. No.: 13/039,129

(22) Filed: Mar. 2, 2011

(65) Prior Publication Data
US 2011/0225423 A1 Sep. 15, 2011

Related U.S. Application Data

(60) Provisional application No. 61/313,103, filed on Mar. 11, 2010.

(51) Int. Cl.
*G06F 21/00* (2013.01)

(52) U.S. Cl.
USPC ........ 713/171; 726/4; 726/6; 726/9; 709/238; 709/226; 380/286; 705/39; 705/71

(58) Field of Classification Search
USPC .......................................................... 713/171
See application file for complete search history.

(56) References Cited

U.S. PATENT DOCUMENTS

| | | | | |
|---|---|---|---|---|
| 5,937,066 | A * | 8/1999 | Gennaro et al. | 380/286 |
| 7,017,188 | B1 * | 3/2006 | Schmeidler et al. | 726/26 |
| 7,987,272 | B2 * | 7/2011 | Kumar et al. | 709/227 |
| 7,996,556 | B2 * | 8/2011 | Raghavan et al. | 709/237 |
| 8,015,400 | B2 * | 9/2011 | Little et al. | 713/156 |
| 2001/0010723 | A1 * | 8/2001 | Pinkas | 380/286 |
| 2001/0050990 | A1 * | 12/2001 | Sudia | 380/286 |
| 2008/0083036 | A1 | 4/2008 | Ozzie et al. | |
| 2008/0091613 | A1 | 4/2008 | Gates, III et al. | |
| 2010/0146294 | A1 * | 6/2010 | Sneed | 713/189 |
| 2011/0072489 | A1 * | 3/2011 | Parann-Nissany | 726/1 |
| 2011/0197065 | A1 * | 8/2011 | Stauth et al. | 713/170 |

FOREIGN PATENT DOCUMENTS

WO WO-2011112629 A1 9/2011

OTHER PUBLICATIONS http://www.ihrim.org/Pubonline/Wire/August12/Encryption%20in%20the%20Cloud%20Ponemon%20July2012. pdf| Encryption in the Cloud|Jul. 2012|Thales e-Security|pp. 1-16.*
"Internation Application Serial No. PCT/S2011/027612, International Search Report mailed May 10, 2011", 4 pgs.
"International Application Serial No. PCT/US2011/027612, International Preliminary Report on Patentability mailed Sep. 20, 2012", 6 pgs.
"International Application Serial No. PCT/US2011/027612, Written Opinion mailed May 10, 2011", 4 pgs.

* cited by examiner

*Primary Examiner* — Mahfuzur Rahman
(74) *Attorney, Agent, or Firm* — Schwegman Lundberg & Woessner, P.A.

(57) ABSTRACT

A method and a system to provide identity encapsulated cryptography are provided. A method may comprise receiving a user key to access a service. The service may be provided by an enterprise and hosted within a public cloud. A request for a country key assigned to a country of a user is transmitted and the country key is received. Session data resulting from the use of the service hosted within the public cloud is encrypted using the user key and the user key is encrypted using the country key. The encrypted session data and the encrypted user key are stored in the public cloud. The country key may be provided to a legal agency of the country of the user to decrypt session data of the user and to not decrypt session data of other users of another country.

16 Claims, 6 Drawing Sheets

SYSTEMS AND METHODS FOR IDENTITY ENCAPSULATED CRYPTOGRAPHY

This application claims the priority benefit of U.S. Provisional Application No. 61/313,103 filed Mar. 11, 2010, and entitled "IDENTITY ENCAPSULATED CRYPTOGRAPHY", which is incorporated herein by reference.

TECHNICAL FIELD

The present application relates generally to the technical field of data encryption and, in one specific example, to identity encapsulated cryptography.

BACKGROUND

Current data encryption is tied to a particular user who can use a number of devices to access data using a single encryption key. The data may be stored in a cloud computing environment where the data of a particular user is physically stored in a country other than the user's country of citizenship or residence.

BRIEF DESCRIPTION OF THE DRAWINGS

Some embodiments are illustrated by way of example and not limitation in the figures of the accompanying drawings in which.

DETAILED DESCRIPTION

Example methods and systems to perform identity encapsulated cryptography are described. In the following description, for purposes of explanation, numerous specific details are set forth in order to provide a thorough understanding of example embodiments. It will be evident, however, to one skilled in the art that the present invention may be practiced without these specific details.

An enterprise is a business entity, charitable foundation, media provider, school, or other organization having an online presence. The enterprise provides one or more services to users, including for example, content delivery, payment services, or the like. The services may be hosted by the enterprise itself or by a public cloud. The public cloud may host a number of different services for various enterprises. Information generated in the course of the user using the services may be stored on behalf of the enterprise in the cloud, on a user device, or by the enterprise itself.

A user may access a particular service of an enterprise using one or more devices associated with the user. The user devices may include, for example, one or more mobile devices, laptops, desktop computers, television boxes, gaming consoles, or the like. The user may use one or more of the devices to access a service associated with an enterprise. For example, a payment service may be accessed by the user to provide payment to the enterprise using a laptop. The same service may be accessed by the user from each the devices.

The enterprise may manage the user's interaction with a service using a "stateless" website that processes a series of requests received from the same device. In some instances, the enterprise may imprint the device used by the user. But if a user is using one of several devices associated with the user, imprinting one device of the user may be inadequate.

The service associated with an enterprise may be hosted within a multi-tenant public cloud that hosts other services for other enterprises. Data generated through the use of each service may be encrypted and stored in the cloud. However, data keys used to encrypt and decrypt the data are not stored in the cloud. Further, the encrypted data within the public cloud may be associated with users from many countries. To encrypt the data encryption key, a unique key encryption key associated with the country of the user is used.

Figure 1:
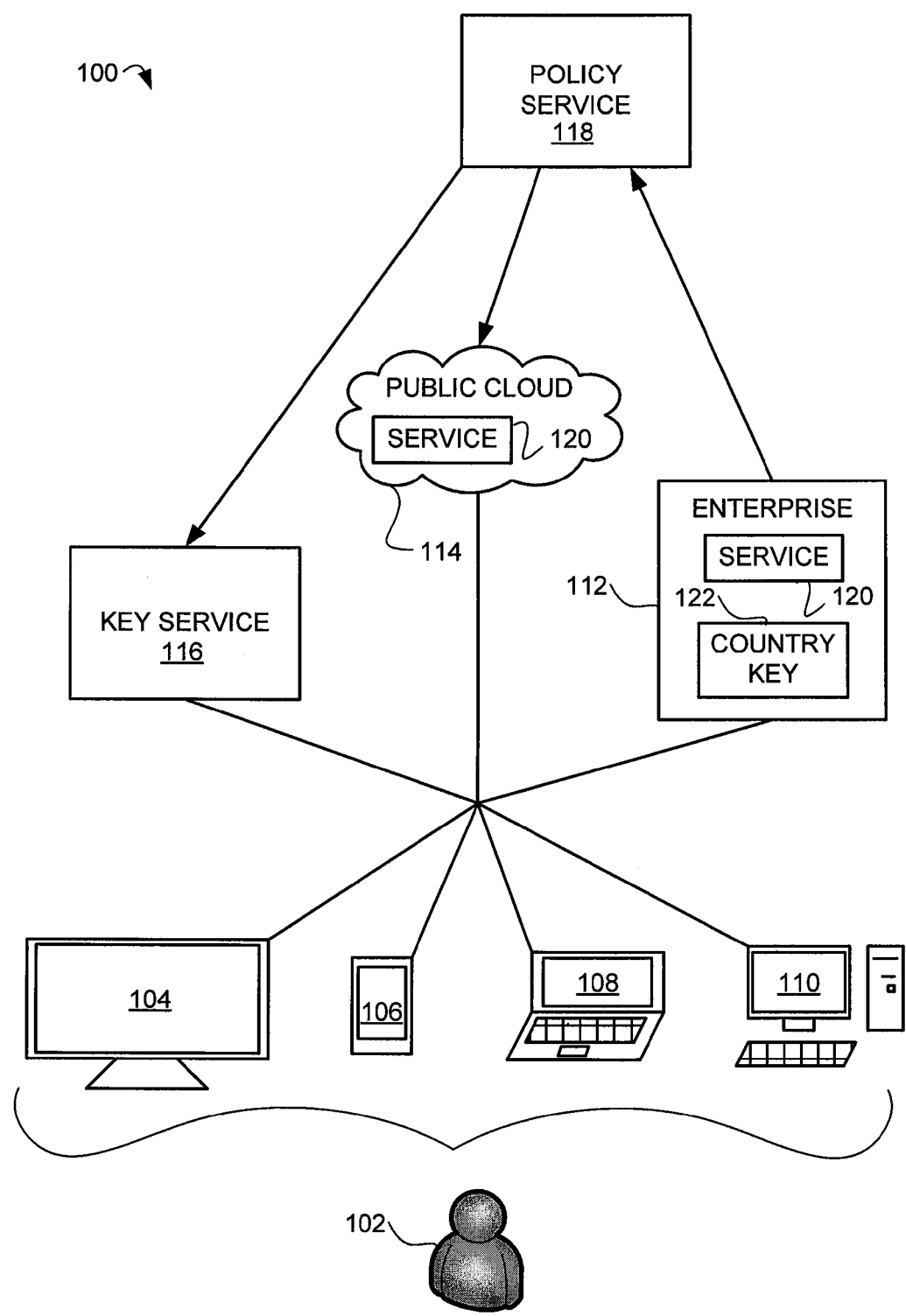
FIG. 1 is a diagram of an example environment in which various embodiments may be implemented.
Figure 5:
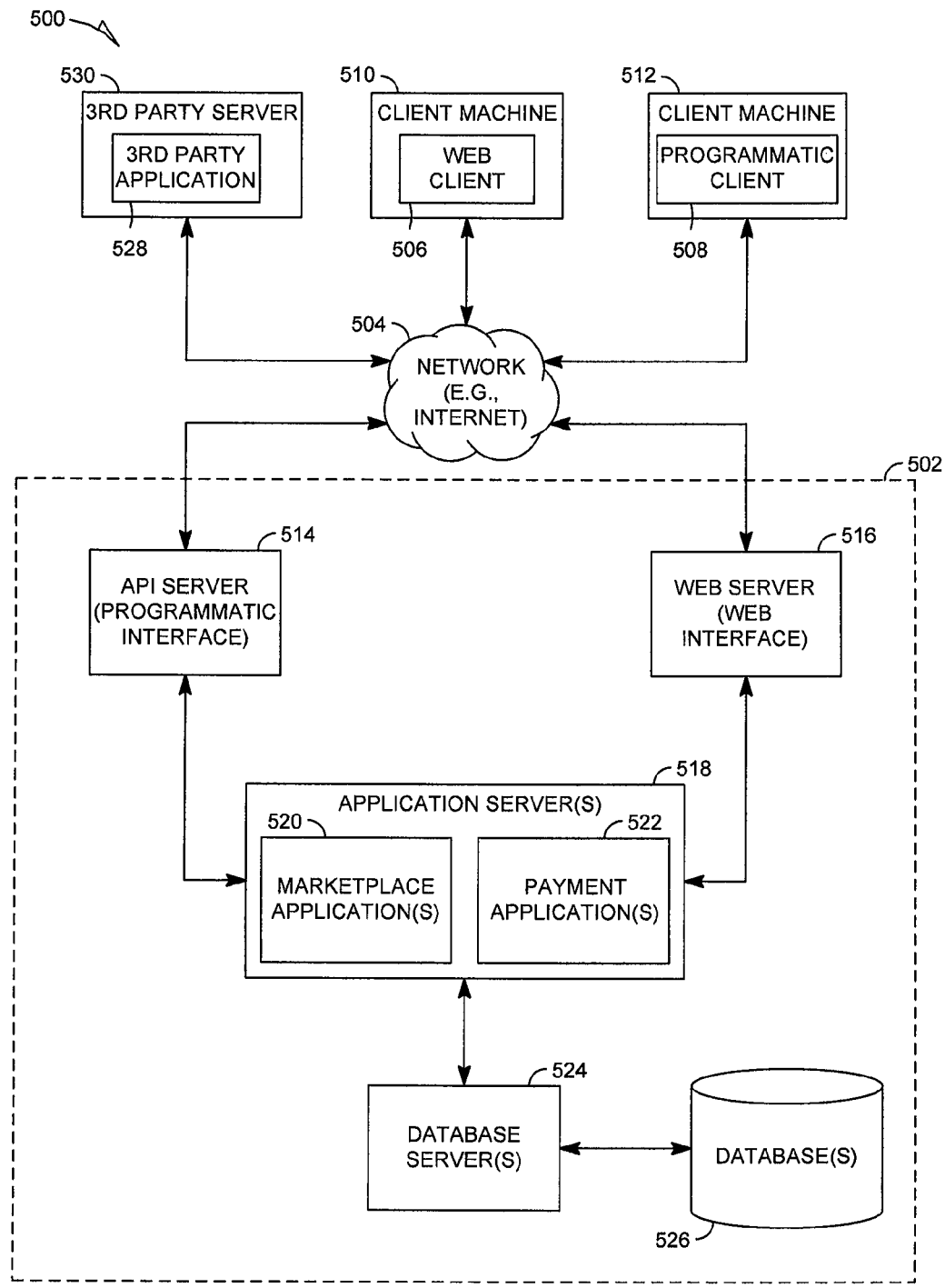
FIG. 5 is a network diagram depicting a client-server system, within which one example embodiment may be deployed.

FIG. 1 is a diagram of an example environment 100 in which various embodiments may be implemented. The environment 100 may be implemented using client-server networks, peer-to-peer networks, or another network configuration. A portion of an example configuration is shown in FIG. 5.

A user 102 may access the environment 100 using one or more user devices, such as a television set 104, a mobile device 106, a laptop computer 108, or a desktop computer 110. The user 104 (e.g., an employee or customer of a particular entity or citizen under the jurisdiction of a government) using the user device is associated with one or more cryptographic keys that, in turn, are bound to a hierarchy of identity information. More specifically, the user 102 is associated with a chain of identities, including a top level identity. The top level identity can be issued by the particular entity or by a government institution such as the European Union. The top level identity encompasses, or is associated with, one or more subordinate identities. Other entities, such as a service provided by an enterprise, are associated with subordinate identities. The subordinate identities, in turn, are associated with specific keys to encrypt or decrypt data and also provide secure access to applications that manage the data. The subordinate identities may further manage data on a per-device basis using additional keys. To manage data on a per-device basis, each device associated with a particular user 102 (e.g., laptop, smart phone, gaming device, etc.) is associated with a unique data encryption key.

The use of a top level identity in conjunction with one or more subordinate identities may lower risk associated with storing data in cloud computing environments by ensuring that the user 102 manages his cryptographic keys stored on the devices associated with the user 102. The top level identity may include a managed name of the user 102, an address of the user 102, and one or more identifiers of the user 102. The identifiers may each be associated with a subordinate identity. The top level identity includes one or more managed keys such as device keys (specific to a particular device) and application keys (specific to a particular application or service).

A top level identity device may be associated with an information claims container (shown in FIG. 2) or token (not shown) carried by the user 102. Alternatively, a privately-developed software client may be used instead of an information claims container. In some instances, a biometric characteristic (e.g., fingerprint) of the user 102 may be used. The top level identity comprises a managed name of the user 102, an address (including country information) of the user 102, one or more identifiers of the user 102, one or more key references to access keys assigned to the user, and additional information. The top level identity may be associated with one or more managed keys such as the device key and the application key. The device key is associated with a particular device of the user. The service key is associated with a service provided by an enterprise accessed by the user 102. The top level identity is issued by, or established by, the top level identity issuer.

The information stored in the information claims container may be referred to as "claims." One or more claims, which are stored as content on an information claims container, encapsulate various types of verified user information such as, name, mailing address, phone number user identifiers, etc. An information claims container includes a secure data set including assertions received from an identity provider that can be accepted, reliably, by a relying party. In some instances, the information claims is an information card. The information claims container (or the information stored therein) associated with user are stored on each user device associated with the user 102. The various information claims containers associated with a particular user may or may not include the same set of claims. A claim, or a subset of claims, may be associated with a key reference stored in the information claims container.

It is noted that while a particular user 102 is associated with only one top level identity, the user 102 and top level identity may be associated with multiple e-commerce identities and multiple device identities. To decrypt or encrypt data, one or more keys may be used. For example, a device-specific subordinate key and an application-specific subordinate key may be used in serial or in parallel.

To illustrate, a mobile device 106 may include an identity application associated with that particular device and used by the user 102 to access services. The identity application may be associated with claims used to access the keys associated with various applications executed using the mobile device 106. The keys managed by the mobile device identity application include device keys and service keys. The mobile device identity is issued by a mobile device identity issuer (e.g., a mobile communications provider).

An enterprise 112 includes business entities, organizations, government agencies or other entities that provide one or more services 120 to users via a network. The services 120 provided may be hosted in a public cloud (e.g., service 120 in a public cloud 114) or by the enterprise 112 itself. The services may include various services for receiving content from users, providing content to users, completing financial transactions between users or between the enterprise 112 and a user 120, providing one or more identities to users, facilitating communication between users, etc.

The enterprise 112, via an identity service, may issue one or more identities to a user based on claims stored in an information claims container on a user device. The identity may include, for example, a user identifier and a device identifier. The identity service may be associated with claims used to access the keys associated with other services provided by the enterprise 112. The keys issued and managed by the identity service include device keys and service keys.

The enterprise 112 (e.g., an e-commerce company) may issue keys and provide an encryption service to secure the data and provide cryptographic keys used to secure the data. In the event that data is physically stored in a country other than the U.S. or the user's country (if not the U.S.), and a foreign law enforcement agent seizes server (or other hardware) where the data is stored, identity encapsulated cryptography may ensure that only data associated with users of that foreign country can be decrypted and viewed. All other user data from other countries cannot be decrypted. As discussed herein, a country key 122 may be provided by the enterprise 112 to secure data based on a country associated with a user of a service provided by the enterprise 112.

A public cloud 114 may be used to host one or more services 120. The public cloud 114 may be located in any country and may host services provided by more than one enterprise 112. Data stored in the public cloud 114 is encrypted using one or more keys. The keys may be stored on a user device or within the enterprise 112. The public cloud 114 may host services 120 or store data for the enterprise 112 in a failover or burst capacity.

A key service 116 manages the top level identity and the one or more keys. The key service 116 provides a cloud-based key management and storage service. More specifically, the key service 116 provides keys to the user devices in response to requests for keys. The user device, e.g., a laptop 108, may request a key to access a service 120. The request may include one or more key references and one or more claims. A key reference may point to a particular key service 116. The claims or the key reference point to a particular key in the key service 116. In some instances, device attributes can be used to authorize the use of a particular key to decrypt or encrypt data. The key service 116 may map the respective keys to top level identities and subordinate identities. Each claim corresponding to a subordinate identity points, in turn, to a top level identity.

The key service 116 stores and manages references to keys. While the key references may be stored in a cloud, the keys themselves are not. The key references may refer to the top level identity and one or more subordinate identities. The top level key reference may include references to one or more specific keys used to encrypt data associated with the top level identity. The subordinate identities may each include a respective service key and a respective device key.

The key service 116 may be implemented as a software client on the user device, a service provided by the enterprise 112, or may be a separate entity (as shown). The keys provided may include keys for streaming encryption and keys for block encryption. If a key service 116 is not used to provide keys, wi-fi keys may be used instead.

The keys provided by the key service 116 are used to develop sessions via secure tunnels between the user device and the service 120, store encrypted data in the public cloud 114, or digitally sign transactions. In some instances, certain claims stored in the information claims container on the user device are tied to certain keys provided by the key service 116. For example, a device-specific claim may be used to reference a session key that, in turn, is used to build a secure channel between the user device and the public cloud 120. The session key may provide streaming encryption between the user device and the public cloud 114.

The keys used in identity encapsulated cryptography enable identity per service encryption. Keys may be used for virtual private network (VPN) or secure channel creation. These keys may sign attributes for, for example, SAML assertions, Assertions for OpenID or OAuth transactions, signatures for ecommerce applications' data, encryption of XML requests, and encryption of other forms of payload. Keys that are used to encrypt data may be stored on smart phones and other devices used by the user 102 to access the Internet.

A policy service 118 is used by the enterprise 112 to provide instructions in the form of policies to the public cloud 114 and the key service 116. The policies may include data encryption standards, key rotation instructions, and other key policies.

Figure 2:
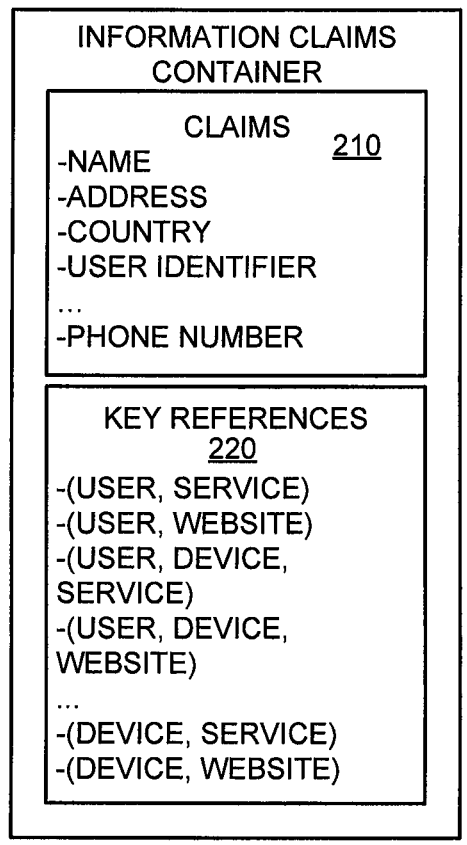
FIG. 2 is a diagram of an example information claims container stored on one or more user devices, according to various embodiments.

FIG. 2 is a diagram of an example information claims container 200 stored on one or more user devices, according to various embodiments. The contents of the information claims container 200 may vary depending on the user device and the identity of the user. The information claims container 200 includes content stored therein such as claims 210 and key references 220.

The claims 210 include information used to establish a top-level identity or subordinate identity of the user. This information can include the user's name, address, country of citizenship or residence, user identifiers for various services 120, a phone number, etc. The claims 210 may vary between user devices used by the user 102.

The key references 220 refer to keys provided by the key service 116. The key references may identify keys to request based on a tuple, as shown in FIG. 2. Parameters that may be included in the tuple may be, for example, a user identifier, a service identifier, a website identifier, a device identifier, or the like. The parameters may be selected based on, for example, a policy administered by the policy service 118.

Figure 3:
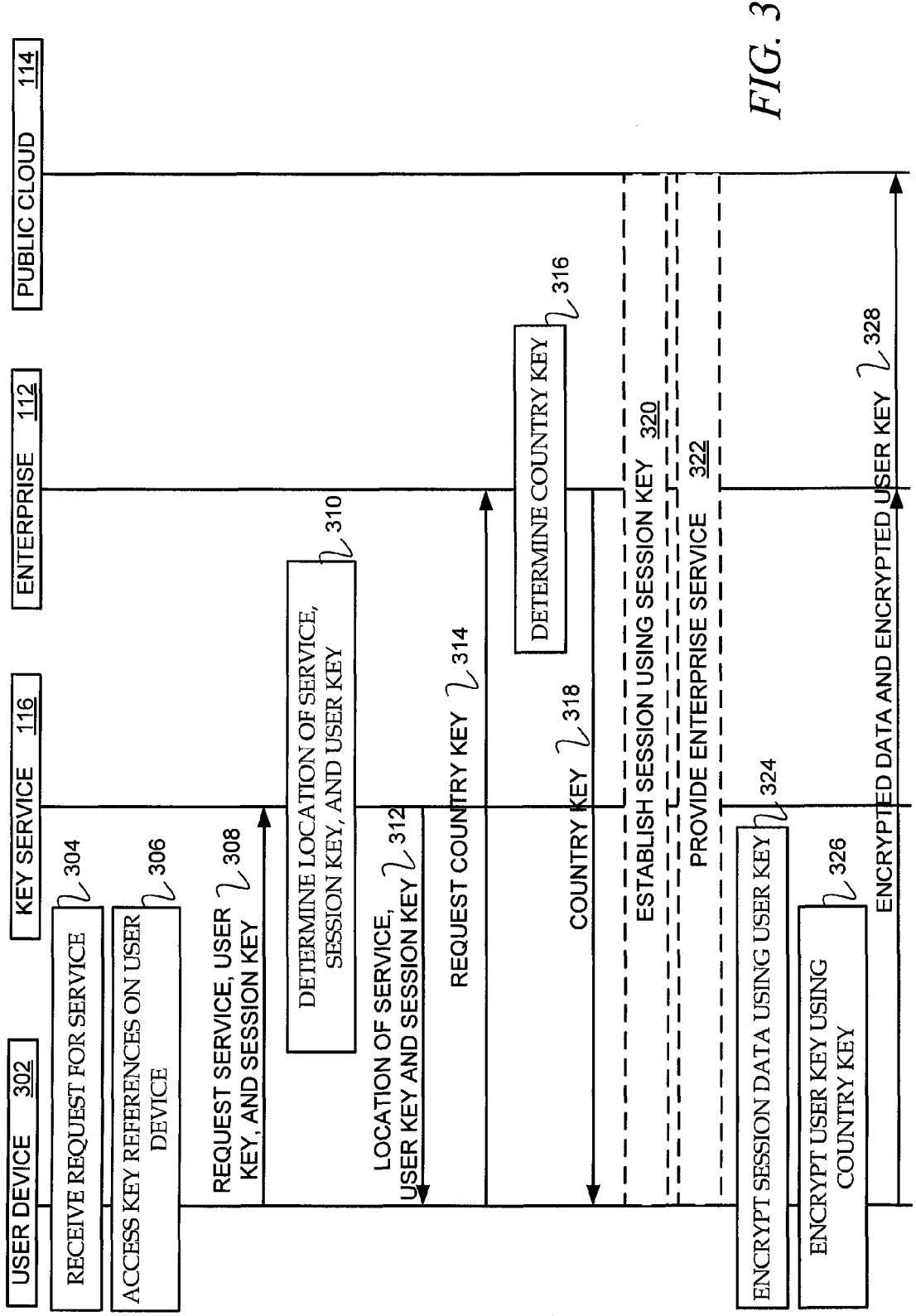
FIG. 3 is a communications diagram of example communications between entities according to various embodiments.

FIG. 3 is a communications diagram of example communications between entities according to various embodiments of identity encapsulated cryptography. The various entities involved include a user device 302 (e.g., the television set 104, the mobile device 106, the laptop computer 108, or the desktop computer 110), the key service 116, the enterprise 112, and the public cloud 114. In the embodiments depicted in FIG. 3, it is assumed that the service requested is hosted in the public cloud 114.

In an operation 304, the user device 302 receives a request for a service (e.g., the service 120) from, for example, the user 102 or from an application installed on the user device 302.

As part of processing the request for the service, in an operation 306, the user device 302 accesses the information claims container (e.g., information claims container 200) stored on the user device and selects the key reference corresponding to the requested service. If more than one user is associated with the user device 302, the user device may identify the user 102 using the user device and select the key corresponding to the user and the service. It is noted that the key references stored in the information claims container may be unique to the user device 302 so that a particular key reference may uniquely identify the user 102, the user device 302, and the service being requested.

In an operation 308, the user device 302 sends the request for the service to the key service 116. The request may include one or more key references and additional requests for a number of keys. In some instances, another request may be sent to the enterprise 112. The request sent to the enterprise 112 may include a request for the service, a request for user data, or other requests. The keys that are requested from the key service 116 may include session keys and user keys. A session key is used during a session to encrypt streaming data passed between the user device 302 and the service. A user key is used to encrypt blocks of data resulting from the session once the session is complete. Additional keys may also be requested according to one or more policies managed by the policy service 118.

In an operation 310, the key service 116 determines the location of the service (e.g., an IP address of the enterprise 112 or the public cloud 114), the session key, and the user key. The keys are determined according to one or more policies managed by the policy service 118.

In an operation 312, the key service 116 transmits the location of the service, the user key, and the session key to the user device 302 via a secure channel. Because the keys are sent to the user device 302, the keys are stored at the user device 302 instead in the public cloud 114.

In an operation 314, the user device 302 sends a request to the enterprise 112 for a country key. This request may be sent before, after, or concurrently with the request sent to the key service 116 in operation 308. The request for the country key may include an indication of the country of the user. The country key is used within identity encapsulated cryptography to encrypt the user key.

In an operation 316, the enterprise 112 determines the country key to be sent to the user device 302. The country of the user may be where the user resides, where the user conducts business, the current location of the user, or the citizenship of the user. The enterprise 112 manages one or more country keys for each country that the enterprise 112 provides one or more services too. Additional keys may be available for particular states, districts, or regions within the countries.

In an operation 318, the enterprise 112 transmits the country key to the user device 302. Accordingly, the country key is stored at least temporarily at the user device 302 and not in the public cloud 114. The country key may be transmitted via a secure channel.

In an operation 320, a session is established between the user device 302 and the public cloud 114. During the established session, the requested service is provided to the user via the user device 302, in an operation 322. The session may be established using a session key for streaming encryption. The session may be a stateless session where the service 120 hosted by the public cloud 114 responds to requests from the user device 302.

After the service 120 has been provided, the session data resulting from the provided service is encrypted as a block using the user key in an operation 324 at the user device 302. The user key, in turn, is encrypted using the country key in an operation 326 at the user device. The encrypted data and the encrypted user key may be sent to the public cloud 114 or the enterprise 112 for storage in an operation 328. As such, the session data and the user key stored in the public cloud 114 are encrypted.

Figure 4:
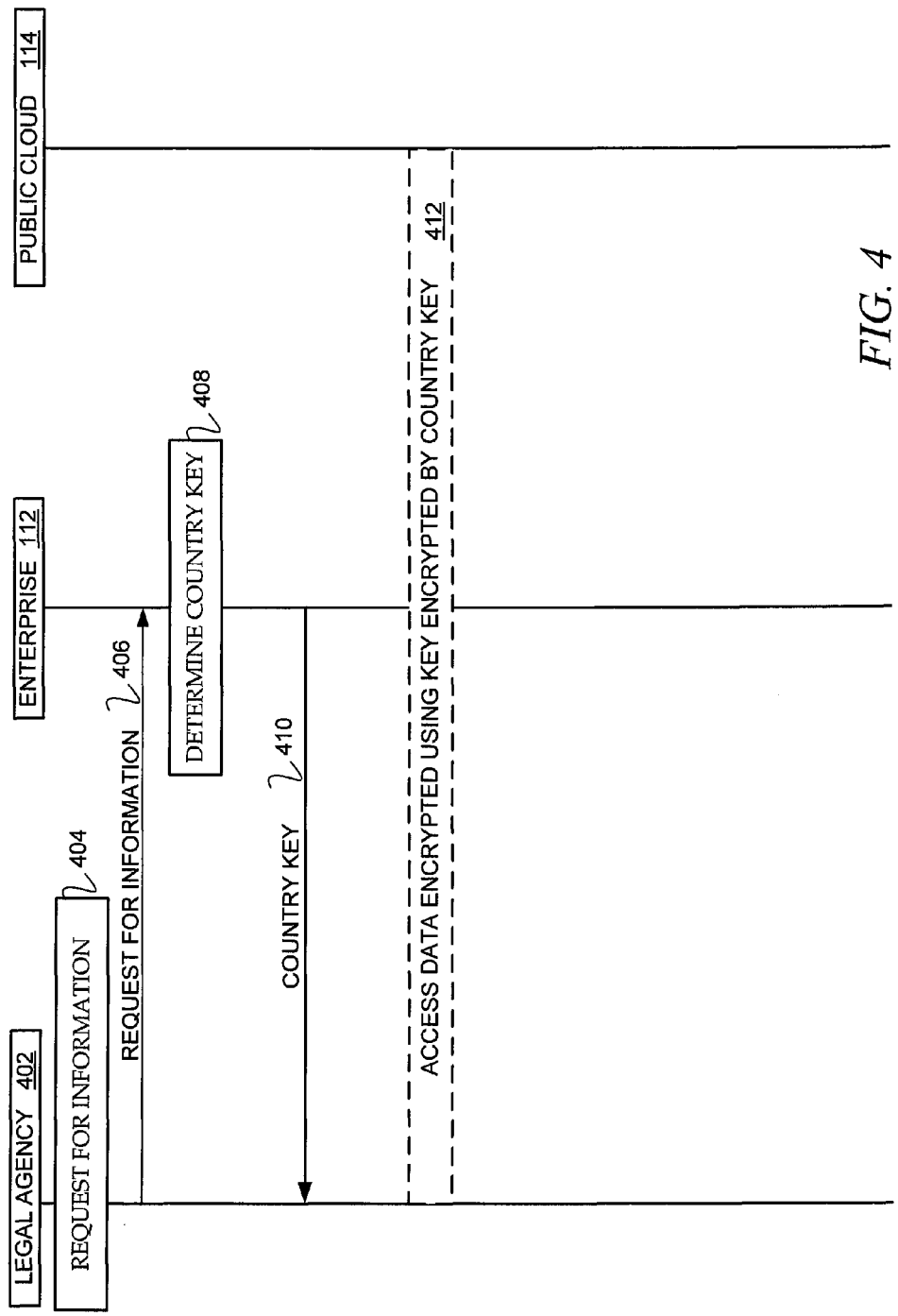
FIG. 4 is a communications diagram of example communications between entities according to various embodiments.

FIG. 4 is a communications diagram of example communications between entities according to various embodiments. In various embodiments, the data stored in the public cloud 114 is encrypted using a user key, which, in turn, is encrypted using a country key. The data may be stored in a public cloud that stores data from many countries and is separately under the jurisdiction of those countries. The public clouds may reside, in whole or in part, in one or more servers or other hardware devices in any location in the world.

The user keys may be stored, for example, by a key service 116. The country keys may be managed by the key service 116 or by the enterprise 112. In FIG. 4, it is assumed that the enterprise 112 manages the country keys. In instances where the session data of users is required by law enforcement agents or other third parties, the country keys are distributed to allow only certain actions.

In FIG. 4, the communications diagram depicts an example technique for a regulator or law enforcement agent associated with a legal agency 402 in a particular country to access data relating to the citizens. To initiate the technique, a request for access to country-specific user data is generated by law enforcement agents in an operation 404. The request is transmitted to the enterprise 112 in an operation 406. In some instances, where the key service 116 manages the country keys, the request may be sent to the key service 116.

The country is identified and the country-specific key for decrypting the country-specific data corresponding to the identified country is determined by the enterprise 112 in an operation 408. The country key may comprise one or more keys based on the scope of the request and the jurisdiction of the legal agency 402.

In an operation 410, the country key is transmitted to the legal agency 402 via a secure channel. Using the country key, the legal agency 403 can decrypt the user data specific to the requesting country while data specific to other countries remains encrypted in an operation 412. The data associated with the requesting country may only be decrypted using a correct country key and may control the decryption process for the enterprise 112. More specifically, the country key, used to encrypt the user key, is used to first decrypt the user key. The decrypted user key is used, in turn, to decrypt the user's session data. In these instances, two identities are mapped: the user's identity and the enterprise's identity. If the received country key and the country key used to encrypt the user key match, the data is decrypted. If the received country key and the country key used to encrypt the user key do not match, the data remains encrypted.

For example, a subordinate identity "x" may be associated with a target service (e.g., an e-commerce application) and be associated with the U.S. The subordinate identity "x" is, in turn, also associated with one or more managed keys such as user key and a U.S. country key. In response to a subpoena or other legal action, the U.S. country key may be provided to the U.S. law enforcement agents by the target service to access country-specific data.

A second subordinate identity "y" is also associated with the target service and is associated with Germany. The subordinate identity "y" is, in turn, also associated with one or more keys such as a German country key and a user key. The German country key is provided to the German law enforcement agents by the target service to access country-specific data.

In some embodiments, the data is encrypted using the XML encryption standard. For example, the data may be encrypted by using a symmetric key and an asymmetric key, by storing the references to the keys with data, and by storing keys with identities. In some embodiments, the user key may be a digital signature.

FIG. 5 is a network diagram depicting a client-server system 500, within which one example embodiment may be deployed. A networked system 502, in the example forms of a network-based marketplace or publication system, provides server-side functionality, via a network 504 (e.g., the Internet or Wide Area Network (WAN)) to one or more clients. FIG. 5 illustrates, for example, a web client 506 (e.g., a browser, such as the Internet Explorer browser developed by Microsoft Corporation of Redmond, Wash. State), and a programmatic client 508 executing on respective client machines 510 and 512.

An Application Program Interface (API) server 514 and a web server 516 are coupled to, and provide programmatic and web interfaces respectively to, one or more application servers 518. The application servers 518 host one or more marketplace applications 520 and payment applications 522. The application servers 518 are, in turn, shown to be coupled to one or more databases servers 524 that facilitate access to one or more databases 526.

The marketplace applications 520 may provide a number of marketplace functions and services to users that access the networked system 502. The payment applications 522 may likewise provide a number of payment services and functions to users. The payment applications 522 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 520. While the marketplace and payment applications 520 and 522 are shown in FIG. 5 to both form part of the networked system 502, it will be appreciated that, in alternative embodiments, the payment applications 522 may form part of a payment service that is separate and distinct from the networked system 502.

Further, while the system 500 shown in FIG. 5 employs a client-server architecture, the present invention is of course not limited to such an architecture, and could equally well find application in a distributed, or peer-to-peer, architecture system, for example. The various marketplace and payment applications 520 and 522 could also be implemented as standalone software programs, which do not necessarily have networking capabilities.

The web client 506 accesses the various marketplace and payment applications 520 and 522 via the web interface supported by the web server 516. Similarly, the programmatic client 508 accesses the various services and functions provided by the marketplace and payment applications 520 and 522 via the programmatic interface provided by the API server 514. The programmatic client 508 may, for example, be a seller application (e.g., the TurboLister application developed by eBay Inc., of San Jose, Calif.) to enable sellers to author and manage listings on the networked system 502 in an off-line manner, and to perform batch-mode communications between the programmatic client 508 and the networked system 502.

FIG. 5 also illustrates a third party application 528, executing on a third party server machine 530, as having programmatic access to the networked system 502 via the programmatic interface provided by the API server 514. For example, the third party application 528 may, utilizing information retrieved from the networked system 502, support one or more features or functions on a website hosted by the third party. The third party website may, for example, provide one or more promotional, marketplace or payment functions that are supported by the relevant applications of the networked system 502.

Figure 6:
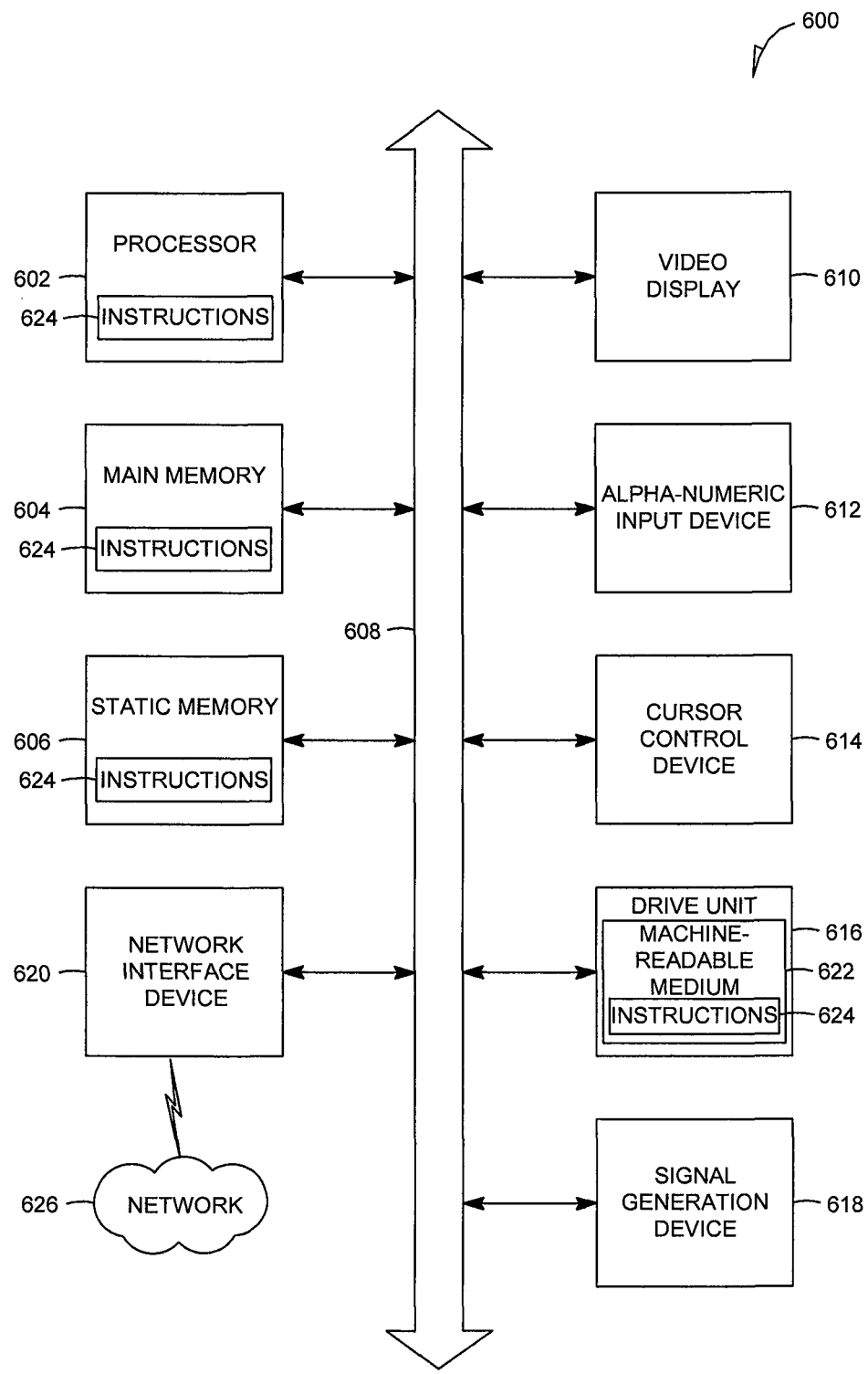
FIG. 6 depicts a diagrammatic representation of machine in the example form of a computer system within which a set of instructions, for causing the machine to perform at least a portion of any one or more of the methodologies discussed herein, may be executed.

FIG. 6 shows a diagrammatic representation of machine in the example form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620. In some instance, the example computer system 600 may include a touchscreen.

The disk drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to provide identity encapsulated cryptography have been described. Some embodiments of the method and system may provide technical solutions to the technical problems of managing access to data in a public cloud and to selectively encrypting and decrypting data in the public cloud. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
generating a first request for a user key to access a service, the service provided by an enterprise and hosted within a public cloud;
receiving the user key in response to the first request;
transmitting a second request for a country key, the country key assigned to a country of a user for whom the user key is requested;
receiving the country key in response to the second request;
encrypting session data resulting from the use of the service hosted within the public cloud using the user key;
encrypting, using one or more processors, the user key using the country key;
transmitting the encrypted session data and the encrypted user key to the public cloud;
generating a third request; the third request being for session data of a plurality of users of the country, including an indication of the country associated with the country key;
receiving the country key in response to the third request;
decrypting user keys stored in the public cloud, the user keys used to encrypt the session data of the plurality of users of the country, wherein other user keys stored in the public cloud encrypted using another country key remain encrypted; and
decrypting the session data of the plurality of users of the country using the decrypted user keys.

2. The method of claim 1, wherein the first request includes one or more key references, the key references stored on an information claims container in a user device.

3. The method of claim 1, wherein the first request further includes a request for a session key.

4. The method of claim 3, further comprising using the session key to establish a session between a user device and the service hosted by the public cloud.

5. The method of claim 1, wherein the user key is received from a key service.

6. The method of claim 1, wherein the user key is assigned to a user device of a plurality of user devices associated with the user.

7. The method of claim 1, wherein the country key is received from the enterprise.

8. The method of claim 1, wherein other session data encrypted using the other user keys remain encrypted.

9. The method of claim 1, wherein the user key comprises a digital signature.

10. The method of claim 1, wherein the country key comprises a plurality of encryption keys.

11. A system comprising:
a non-transitory memory to store one or more information claims containers, the one or more information claims containers including one or more claims and one or more key references; and
one or more processors configured to;
generate a first request for a user key to access a service, the service provided by an enterprise and hosted within a public cloud;
receive the user key in response to the first request;
transmit a second request for a country key the country key assigned to a country of a user for whom the user key is requested;
receive the country key in response to the second request;
encrypt session data resulting from the use of the service hosted within the public cloud using the user key;
encrypt the user key using, the country key;

transmit the encrypted session data and the encrypted user key to the public cloud;

generate a third request, the third request being for session data of a plurality of users of the country, including an indication of the country associated with the country key;

receive the country key in response to the third request;

decrypt user keys stored in the public cloud, the user keys used to encrypt the session data of the plurality of users of the country, wherein other user keys stored in the public cloud encrypted using another country key remain encrypted; and decrypt the session data of the plurality of users of the country using the decrypted use keys.

12. The system of claim 11, wherein the first request includes one or more key references, the key references stored on an information claims container in a user device.

13. The system of claim 11, wherein the first request further includes a request for a session key.

14. The system of claim 13, wherein the one or more processors are farther to use the session key to establish, a session between a user device and the service hosted by the public cloud.

15. The system of claim 11, wherein the user key is assigned to a user device of a plurality of user devices associated with the user.

16. The system of claim 11, wherein other session data encrypted using, the other user keys remain encrypted.

* * * * *

UNITED STATES PATENT AND TRADEMARK OFFICE
CERTIFICATE OF CORRECTION

PATENT NO. : 8,621,220 B2  
APPLICATION NO. : 13/039129  
DATED : December 31, 2013  
INVENTOR(S) : Liam Sean Lynch Page 1 of 1

It is certified that error appears in the above-identified patent and that said Letters Patent is hereby corrected as shown below:

In the Claims:

In column 10, line 17, in Claim 1, delete "request;" and insert --request,--, therefor In column 10, line 56, in Claim 11, delete "to;" and insert --to:--, therefor In column 10, line 61, in Claim 11, delete "key" and insert --key,--, therefor In column 10, line 67, in Claim 11, delete "using," and insert --using--, therefor In column 11, line 14, in Claim 11, delete "use" and insert --user--, therefor In column 11, line 21, in Claim 14, delete "farther" and insert --further--, therefor In column 11, line 21, in Claim 14, delete "establish," and insert --establish--, therefor In column 11, line 28, in Claim 16, delete "using," and insert --using--, therefor Signed and Sealed this  
Seventeenth Day of June, 2014

Michelle K. Lee  
*Deputy Director of the United States Patent and Trademark Office*